United States Patent
Chang et al.

(10) Patent No.: US 9,185,679 B2
(45) Date of Patent: Nov. 10, 2015

(54) METHOD OF LOW-DUTY MODE OPERATION OF FEMTOCELL BASE STATION

(75) Inventors: Sung Cheol Chang, Daejeon (KR); Won-Ik Kim, Daejeon (KR); Hyun-Jae Kim, Incheon (KR); Sung Kyung Kim, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 13/393,213

(22) PCT Filed: Aug. 10, 2010

(86) PCT No.: PCT/KR2010/005232
§ 371 (c)(1),
(2), (4) Date: Feb. 28, 2012

(87) PCT Pub. No.: WO2011/025161
PCT Pub. Date: Mar. 3, 2011

(65) Prior Publication Data
US 2012/0157131 A1 Jun. 21, 2012

(30) Foreign Application Priority Data

Aug. 28, 2009 (KR) .......... 10-2009-0080672
Aug. 9, 2010 (KR) .......... 10-2010-0076557

(51) Int. Cl.
*H04W 68/00* (2009.01)
*H04W 84/04* (2009.01)

(52) U.S. Cl.
CPC ............ *H04W 68/00* (2013.01); *H04W 84/045* (2013.01)

(58) Field of Classification Search
CPC ... H04W 68/00; H04W 68/005; H04W 68/02; H04W 68/025; H04W 84/02–84/027; H04W 84/04–84/16; H04W 84/045; H04W 36/0083; H04W 52/0206; H04W 52/0216; H04W 72/005; H04W 28/26; H04W 36/04; H04W 52/0225; H04W 52/10; H04W 52/146; H04W 72/02; H04W 72/082; H04W 72/12
See application file for complete search history.

(56) References Cited

U.S. PATENT DOCUMENTS 5,953,323 A * 9/1999 Haartsen .................. 370/330
7,450,926 B2 11/2008 Chang et al.
(Continued)

FOREIGN PATENT DOCUMENTS

EP 2003809 A2 12/2008
KR 10-0606065 7/2008
(Continued)

OTHER PUBLICATIONS

International Search Report dated Feb. 25, 2011 in connection with International Patent Application No. PCT/KR2010/005232.
(Continued)

*Primary Examiner* — Mehmood B Khan

(57) ABSTRACT

A method of setting a cycle of a low-duty mode in a femto base station is provided. The cycle of the low-duty mode has a pattern in which an available interval and an unavailable interval repeatedly appear, and the available interval is set to include a paging listening interval of a paging cycle. A method of setting a cycle of a low-duty mode in a femto base station having a service area overlapping with that of a macrocell is provided. An unavailable interval is set by taking the overlapping degree of the service area of the femto base station with the macrocell into consideration. A method of setting a cycle of a low-duty mode in a plurality of femto base stations operated in the low-duty mode is provided. The same cycle can be set for a plurality of base stations.

19 Claims, 7 Drawing Sheets

(56) References Cited

U.S. PATENT DOCUMENTS

| | | | |
|---|---|---|---|
| 2007/0057767 A1* | 3/2007 | Sun et al. | 340/7.35 |
| 2007/0087767 A1 | 4/2007 | Pareek et al. | |
| 2009/0209273 A1 | 8/2009 | Ha et al. | |
| 2009/0264129 A1* | 10/2009 | Oguchi | 455/436 |
| 2009/0280819 A1* | 11/2009 | Brisebois et al. | 455/446 |
| 2009/0310563 A1* | 12/2009 | Chou et al. | 370/331 |
| 2010/0054237 A1* | 3/2010 | Han et al. | 370/350 |
| 2010/0067421 A1* | 3/2010 | Gorokhov et al. | 370/311 |
| 2010/0111047 A1* | 5/2010 | Yang et al. | 370/336 |
| 2010/0232330 A1* | 9/2010 | Cheng et al. | 370/311 |
| 2010/0240420 A1* | 9/2010 | Chin et al. | 455/574 |
| 2010/0304743 A1* | 12/2010 | Jung et al. | 455/434 |
| 2010/0309849 A1* | 12/2010 | Park et al. | 370/328 |
| 2011/0003591 A1* | 1/2011 | Venkatachalam et al. | 455/434 |
| 2011/0158168 A1* | 6/2011 | Chen et al. | 370/328 |
| 2011/0244792 A1* | 10/2011 | Park et al. | 455/39 |
| 2012/0008581 A1* | 1/2012 | Kojima | 370/329 |
| 2012/0077486 A1* | 3/2012 | Park et al. | 455/422.1 |
| 2012/0108238 A1* | 5/2012 | Kim et al. | 455/435.1 |
| 2014/0179324 A1* | 6/2014 | Lee | 455/437 |

FOREIGN PATENT DOCUMENTS

| | | | |
|---|---|---|---|
| KR | 10-2008-0109677 | 12/2008 | |
| KR | 10-2009-0074991 | 7/2009 | |
| WO | WO 2010105117 A1 * | 9/2010 | H04W 52/02 |

OTHER PUBLICATIONS

Written Opinion of International Searching Authority dated Feb. 25, 2011 in connection with International Patent Application No. PCT/KR2010/005232.

IEEE 802.16m-09/0034, IEEE 802.16m System Description Document (SDD), Jul. 27, 2009, 160 pages.

IEEE P802.16m/D1, "Part 16: Air Interface for Broadband Wireless Access Systems", IEEE 802.16m Draft Amendment, Jul. 31, 2009, 514 pages.

* cited by examiner

METHOD OF LOW-DUTY MODE OPERATION OF FEMTOCELL BASE STATION

CROSS-REFERENCE TO RELATED APPLICATION(S)

The present application claims priority under 35 U.S.C. §365 to International Patent Application No. PCT/KR2010/005232 filed Aug. 10, 2010, entitled "METHOD FOR RUNNING A LOW-DUTY MODE IN A FEMTOCELL BASE STATION". International Patent Application No. PCT/KR2010/005232 claims priority under 35 U.S.C. §365 and/or 35 U.S.C. §119(a) to Korean Patent Application No. 10-2009-0080672 filed Aug. 28, 2009 and Korean Patent Application No. 10-2010-0076557 filed Aug. 9, 2010, and which are incorporated herein by reference into the present disclosure as if fully set forth herein.

BACKGROUND OF THE INVENTION (a) Field of the Invention

The present invention relates to a method of low-duty mode operation in a femto base station.

(b) Description of the Related Art

A femto base station refers to an ultra-small base station that manages a femtocell having a smaller service area than a macrocell. The femtocell serves to improve speech quality in an indoor space which the coverage of the macrocell cannot reach, and to share the load of the macrocell, and is able to reduce communication cost. However, the femtocell may degrade the performance of mobile stations MS in the femtocell and the macrocell due to interference with the macrocell. To solve this problem, the femto base station supports a low-duty mode LDM as well as a normal mode.

The femto base station enters the low-duty mode if there is no mobile station attached in the femto base station or all the mobile stations present in the femtocell are in an idle or sleep mode. The cycle of the low-duty mode has a pattern (hereinafter, referred to as a "low-duty mode cycle pattern") in which an available interval AI and an unavailable interval UAI alternately appear. The femto base station operates in the low-duty mode cycle pattern. During an available interval, the femto base station may become active on the air interface for synchronization with a mobile station, paging, ranging, or data traffic transmission. During an unavailable interval, it does not transmit on the air interface.

SUMMARY OF THE INVENTION

The present invention has been made in an effort to provide a low-duty mode cycle pattern which enables a mobile station to efficiently scan a femto base station and reduce interference between the femto base station and a neighboring base station.

An exemplary embodiment of the present invention provides a method of low-duty mode operation in a femto base station, the method including: managing a paging cycle including a paging listening interval and a paging unavailable interval; setting a low-duty mode cycle pattern including an available interval and an unavailable interval by taking the paging cycle into consideration; and operating the low-duty mode according to the cycle pattern.

The setting may include setting the available interval to include the paging listening interval.

The setting may include setting the unavailable interval to be shorter than the paging unavailable interval.

The operating may include: activating a wireless channel for communication during the available interval; and performing no transmission to the wireless channel during the unavailable interval.

The managing may include managing a plurality of paging cycles, and the setting may include setting the plurality of low-duty mode cycle patterns respectively corresponding to the plurality of paging cycles.

The operating may include, if at least one available interval appears in the plurality of low-duty mode cycle patterns, operating the low-duty mode at the available interval.

Another exemplary embodiment of the present invention provides a method of low-duty mode operation in a femto base station, the method including: determining the overlapping degree of the service area of the femto base station with the service area of a macrocell base station; setting a low-duty mode cycle pattern including an available interval and an unavailable interval by taking the overlapping degree into consideration; and operating the low-duty mode according to the cycle pattern.

The setting may include setting the unavailable interval to be longer as the overlapping degree becomes larger.

The setting may include setting the available interval to include a paging listening interval of a paging cycle set for the femto base station.

Another exemplary embodiment of the present invention provides a method of low-duty mode operation in any one femto base station of a base station group including a plurality of femto base stations, the method including: entering the low-duty mode; and operating the low-duty mode according to a low-duty mode cycle pattern set for the plurality of femto base stations and including an available interval and an unavailable interval.

The method may further include, if a paging listening interval of the paging cycle managed by any one femto base station is not included in the available interval, shifting the paging listening interval so as to be included in the available interval.

The method may further include transmitting, to a terminal, a message notifying that the paging listening interval has been shifted.

If a paging listening interval of the paging cycle managed by any one femto base station is not included in the available interval, the operating may include: changing the cycle pattern by adding an available interval including the paging listening interval to the cycle pattern; and operating the low-duty mode according to the changed cycle pattern.

The plurality of femto base station may include base stations using the same frequency.

The plurality of femto base stations may include base stations using the same paging group ID.

In the method, the available interval may be set to include the paging listening interval of the paging cycle used by the paging group.

According to an exemplary embodiment of the present invention, interference between a femto base station operated in the low-duty mode and a neighboring base station can be minimized, and the terminal can fast scan the femto base station.

DETAILED DESCRIPTION OF THE EMBODIMENTS

Figure 1:
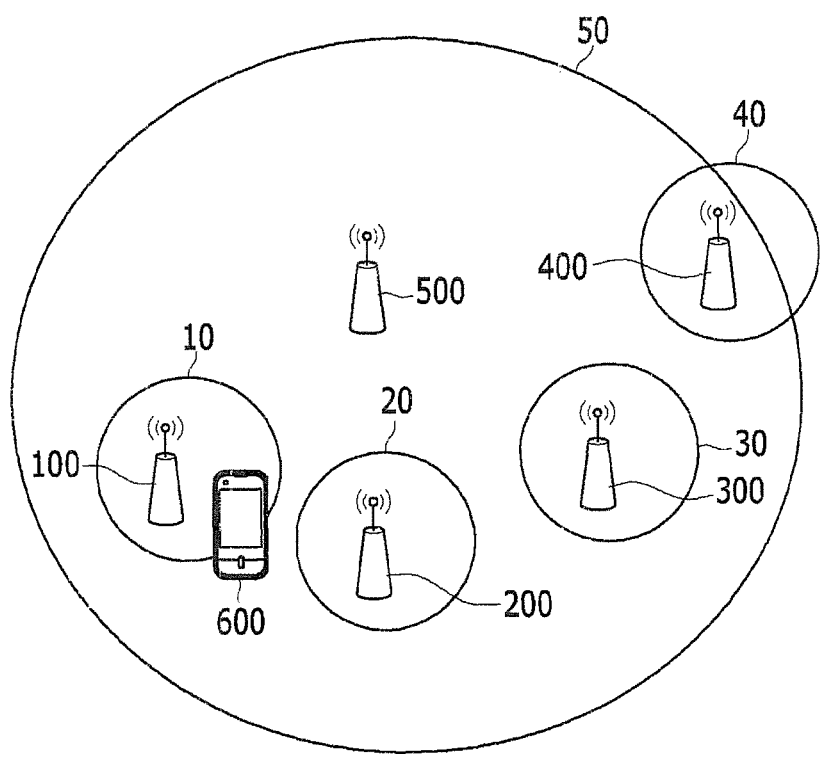
FIG. 1 is a view schematically showing a femto base station and a macrocell base station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a node B (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A method of low-duty mode operation according to an exemplary embodiment of the present invention will now be described in detail.

FIG. 1 is a view schematically showing a femto base station and a macrocell base station according to an exemplary embodiment of the present invention.

Referring to FIG. 1, a wireless communication system includes a plurality of femto base stations 100 to 400 and a macrocell base station 500, and each of the base stations 100 to 500 manages predetermined cell areas 10 to 50. The macrocell 50 and the femtocells 10 to 40 may overlap with each other, and the macrocell 500 can manage the femto base stations 100 to 400.

A terminal 600 is attached to at least one of the base stations 100 to 500 to transmit and receive data. If there is no data to be transmitted and received for a predetermined amount of time, the terminal may enter the idle mode. The terminal in the idle mode receives paging information including a paging group ID PGID, a paging cycle, and a paging offset from the base stations 100 to 500. The paging group ID is an ID indicating a paging group to which a base station belongs, the paging cycle includes a paging listening interval PLI and a paging unavailable interval PUI, and the terminal performs monitoring of a broadcasting channel in the paging listening interval. The paging offset is a parameter used when a time point capable of paging a specific terminal is determined. The terminal has a paging listening interval after waiting the paging offset in the paging cycle.

The femto base stations 100 to 400 may be operated in the low-duty mode LDM when there is no terminal located in the femtocells 10 to 40 or the terminals present therein are in the idle mode. The low-duty mode may be operated in a periodic pattern in which an available interval AI and an unavailable interval UAI are repeated with predetermined lengths, or may be operated in a non-periodic pattern in which an available interval AI and an unavailable interval UAI appear at random lengths.

The terminal 600 scans the femto base stations 100 to 400 in order to perform initial network entry or perform handover. Because the terminal 600 cannot scan the femto base stations 100 to 400 during the unavailable interval UAI of the low-duty mode, the terminal 600 waits for the available interval AI during the unavailable interval UAI and scan them during the available interval AI. Also, if the terminal 600 cannot scan the first frame of an available interval AI, the terminal 600 scans a preamble during the next available interval AI. Moreover, if the terminal 600 has to scan a number of preambles, it may not complete the scanning of the femto base stations 100 to 400 during one available interval AI. Accordingly, if an unavailable interval UAI is long, the scanning time of the terminal 600 is lengthened. If an available interval AI is lengthened in order to reduce the scanning delay of the terminal 600, it increases the interference with the macrocell base station 500. In this manner, the available interval AI and the unavailable interval UAI affect the performances of the terminal 600 and the base stations 100 to 500 depending on their length. Next, a method of setting a low-duty mode cycle pattern for the femto base stations 100 to 400 to reduce the scanning delay of the terminal 600 and reduce interference to neighboring cells will be described.

Figure 2:
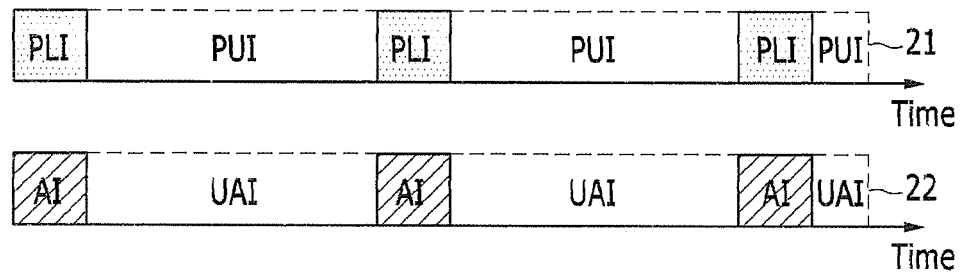
FIG. 2 to FIG. 4 are views showing a method of low-duty mode operation in consideration of a paging cycle according to an exemplary embodiment of the present invention.
Figure 3:
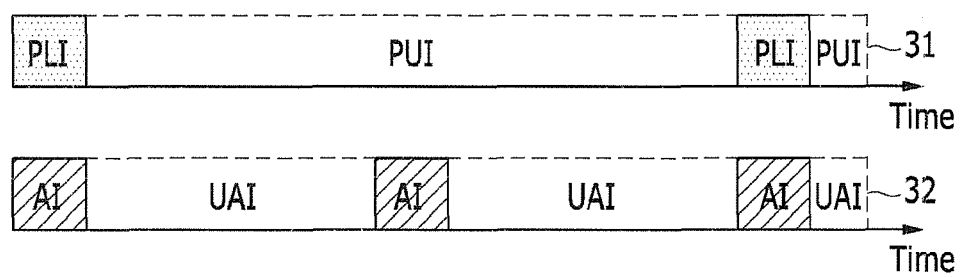
Figure 4:
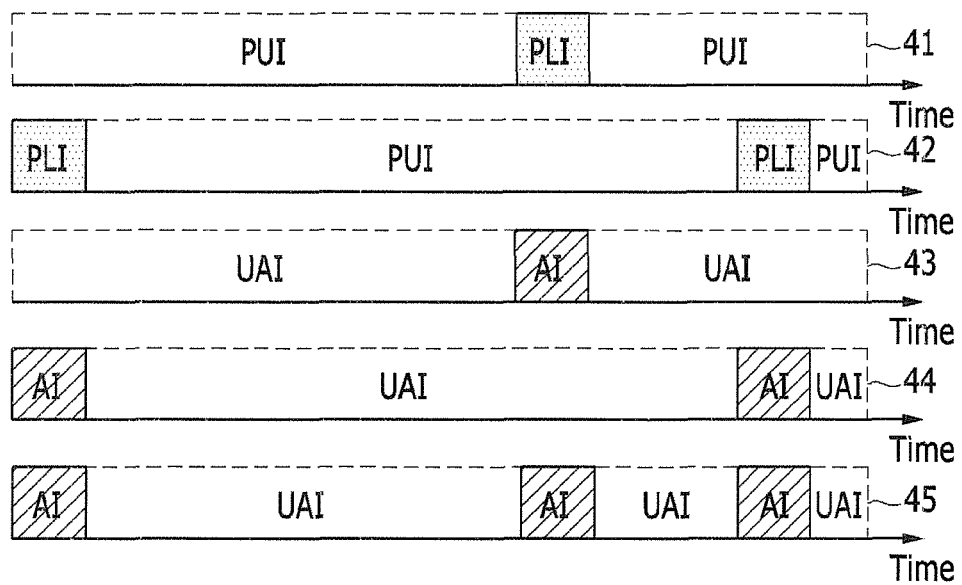

FIG. 2 to FIG. 4 are views showing a method of low-duty mode operation according to an exemplary embodiment of the present invention.

Referring to FIG. 2 to FIG. 4, in the low-duty mode, the femto base station sets the low-duty mode cycle pattern based on a paging cycle which is managed by the femto base station. At this point, the low-duty mode cycle pattern is set such that available interval AI of the low-duty mode cycle pattern comprise paging listening interval PLI of the paging cycle.

Concretely, referring to FIG. 2, the femto base station according to an exemplary embodiment may set the paging cycle 21 and one cycle of the low-duty mode cycle pattern 22 to be equal, and may set the available interval AI of the low-duty mode cycle pattern 22 to include the paging listening interval PLI of the paging cycle 21. Also, the length of the available interval AI may be set to be equal to or longer than the length of the paging listening interval PLI. Moreover, the scanning performance of a terminal may vary according to the settings of the paging cycle because the low-duty mode cycle pattern is dependent on the paging cycle.

Referring to FIG. 3, the femto base station according to another exemplary embodiment may set an available interval AI of the low-duty mode cycle pattern 32 to include a paging listening interval PLI of the paging cycle 31, and may set an unavailable interval UAI to be shorter than a paging unavailable interval PUI to thus make the available interval AI occur more frequently than the paging listening interval PLI. In this case, the scanning performance of the femto base station for a terminal may be improved due to frequently occurring available intervals AI.

Referring to FIG. 4, the femto base station according to still another exemplary embodiment operates the low-duty mode by taking a plurality of paging cycles managed by itself into consideration. At this point, an available interval AI of the low-duty mode is set to include each paging listening interval PLI of all the paging cycles. To this end, the femto base station may set a plurality of low-duty mode cycle patterns corresponding to a plurality of paging cycles, and may operate the low-duty mode by taking the plurality of low-duty mode cycle patterns into consideration. For example, low-duty mode cycle patterns 43 and 44 are respectively set corresponding to a plurality of paging cycles 41 and 42 set for a terminal managed by the femto base station. At this point, as explained in FIGS. 2 and 3, each low-duty mode cycle pattern is set such that an available interval AI of the low-duty mode cycle patterns 43 and 44 includes each paging listening interval PLI of the paging cycles 41 and 42. Also, as in the cycle pattern 45, if at least one available interval AI appears in the plurality of set low-duty mode cycle patterns 43 and 44, the femto base station is operated at the available interval AI of the low-duty mode.

Figure 5:
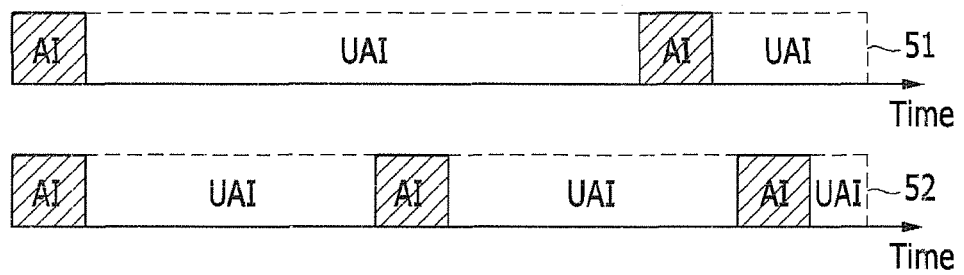
FIG. 5 is a view showing a method of low-duty mode operation according to another exemplary embodiment of the present invention.

FIG. 5 is a view showing a method of low-duty mode operation according to another exemplary embodiment of the present invention.

Referring again to FIG. 1, while the service area 40 of the femto base station 400 partially overlaps with the service area 50 of the macrocell base station 500, the service areas 10 to 30 of the femto base stations 100 to 300 are fully included in the service area 50 of the macrocell base station 500. As shown in FIG. 5, the unavailable interval UAI of the low-duty mode cycle pattern 51 for a fully overlapping service area is set longer than that of the low-duty mode cycle pattern 52 for a partially overlapping service area. That is, the unavailable interval UAI of the low-duty mode is set to be longer as the service area of a femto base station overlapping with that of the macrocell base station becomes larger.

In the case that the service area of the femto base station is fully included in the macrocell, the scanning of the femto base station may be delayed because the unavailable interval is lengthened. However, the terminal can maintain wireless connection from the macrocell base station, thus ensuring service continuity. Also, interference with the macrocell may be reduced because the unavailable interval UAI is set to be long.

In the case that a part of the service area of the femto base station overlaps with that of the macrocell, if a delay occurs when the terminal scans the femto base station, the service continuity of the terminal may not be ensured. Accordingly, in order to reduce scanning delay, the unavailable interval UAI is set to be short so that the available interval AI frequently occurs.

In this manner, when setting an unavailable interval UAI by taking the overlapping degree of the service area of the femto base station with the macrocell into consideration, as shown in FIGS. 2 to 4, an available interval AI may be set to include a paging listening interval PLI.

Figure 6:
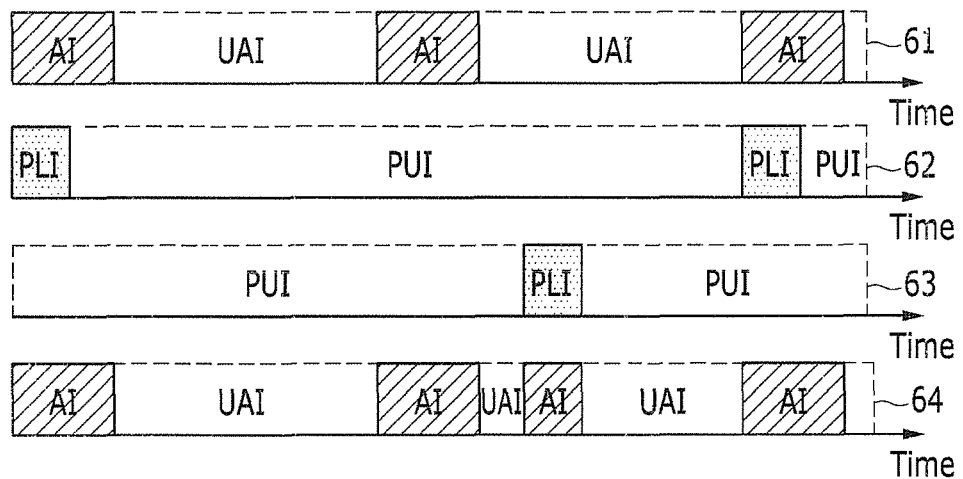
FIG. 6 and FIG. 7 are views showing a method of low-duty mode operation in a plurality of paging groups according to still another exemplary embodiment.
Figure 7:
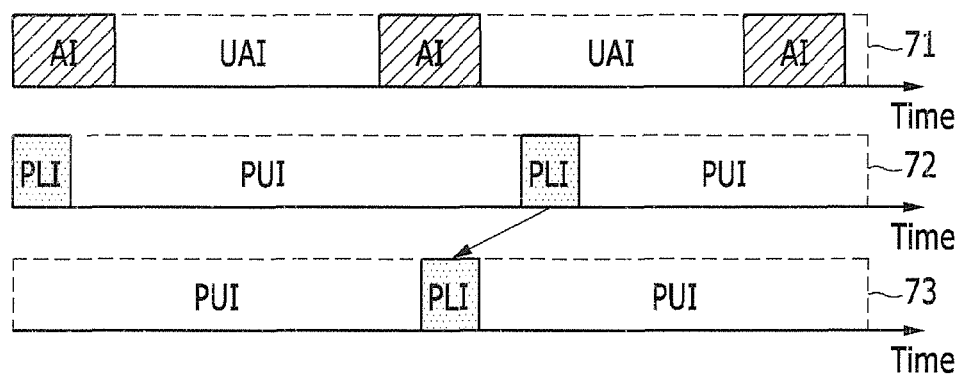

FIG. 6 and FIG. 7 are views showing a method of low-duty mode operation according to still another exemplary embodiment.

The same low-duty mode cycle pattern 61 may be set for a plurality of femto base stations. The plurality of femto base stations may be femto base stations using the same frequency. In this case, each femto base station has different paging cycles 62 and 63. As such, while a paging listening interval PLI of the paging cycle 62 set for some femto base station is included in an available interval AI, a paging listening interval PLI of the paging cycle 63 set for other femto base stations may not be included therein. In this manner, a femto base station whose paging listening interval PLI is not included in the available interval AI of the low-duty mode cycle pattern 61 may be operated in a pattern 64 in which an available interval AI corresponding to the paging listening interval PLI is included.

Referring to FIG. 7, a femto base station whose paging listening interval PLI of a paging cycle 72 is not included in an available interval AI of an low-duty mode cycle pattern 71 may change its paging cycle 72 to a paging cycle 73 in which a paging listening interval PLI is included in an available interval AI. At this point, the paging offset of a paging listening interval PLI in the paging cycle 72 may be shifted into the available interval AI. The base station that has shifted the paging offset may transmit a message notifying the terminal that the paging offset has been shifted.

The plurality of femto base stations using the same paging group ID PGID may operate the same low-duty mode cycle pattern in the same method as explained in FIG. 2 or FIG. 3. As the base stations using the same paging group ID have the same paging cycle, the available intervals AIs may be set to include paging listening intervals PLIs. At this point, the available interval AI may be set to include a paging listening interval PLI without shifting the paging offset because the base stations using the same paging group ID have the same paging cycle.

In the case that a femto base station sets a low-duty mode cycle pattern in this manner, the terminal has to know the low-duty mode cycle pattern in advance in order to scan the femto base station for connection. The terminal may acquire the low-duty mode cycle pattern from the femto base station, or acquire the low-duty mode cycle pattern through a broadcast or unitcast message received from the macrocell base station overlapping with the femtocell. Alternatively, if the terminal attempts initial network entry to the femtocell, a low-duty mode cycle pattern may be acquired through a unicast message received upon femtocell registration, for example, an AAI_REG-RSP message.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of operating a low-duty mode in a femto base station, the method comprising:
    managing a paging cycle including a paging listening interval and a paging unavailable interval;
    setting a low-duty mode cycle pattern including an available interval and an unavailable interval based on the paging cycle;
    operating the low-duty mode according to the low-duty mode cycle pattern; and
    if the paging listening interval of the paging cycle managed by the femto base station is not included in the available interval, operating the low-duty mode comprises:
        changing the low-duty mode cycle pattern by adding the available interval including the paging listening interval to the low-duty mode cycle pattern; and
        operating the low-duty mode according to the changed low-duty mode cycle pattern.

2. The method of claim 1, wherein the setting comprises setting the available interval to include the paging listening interval.

3. The method of claim 2, wherein the setting comprises setting the unavailable interval to be shorter than the paging unavailable interval.

4. The method of claim 1, wherein:
   the managing comprises managing a plurality of paging cycles, and
   the setting comprises setting a plurality of low-duty mode cycle patterns respectively corresponding to the plurality of paging cycles.

5. The method of claim 4, wherein the operating comprises, if at least one available interval appears in the plurality of low-duty mode cycle patterns, operating the low-duty mode at the at least one available interval.

6. A method of operating a low-duty mode in a femto base station, the method comprising:
   determining an overlapping area of a service area of the femto base station with a service area of a macrocell base station;
   setting a low-duty mode cycle pattern including an available interval and an unavailable interval by taking the overlapping area into consideration;
   operating the low-duty mode according to the low-duty mode cycle pattern; and
   if a paging listening interval of a paging cycle managed by the femto base station is not included in the available interval, operating the low-duty mode comprises:
      changing the low-duty mode cycle pattern by adding the available interval including the paging listening interval to the low-duty mode cycle pattern; and
      operating the low-duty mode according to the changed low-duty mode cycle pattern.

7. The method of claim 6, wherein the setting comprises setting the unavailable interval to be longer as the overlapping area becomes larger.

8. The method of claim 6, wherein the setting comprises setting the available interval to include a paging listening interval of a paging cycle set for the femto base station.

9. A method of operating a low-duty mode in any one femto base station of a base station group including a plurality of femto base stations, the method comprising:
   entering the low-duty mode;
   operating the low-duty mode according to a same low-duty mode cycle pattern set for the plurality of femto base stations, the low-duty mode cycle pattern including an available interval and an unavailable interval; and
   if a paging listening interval of a paging cycle managed by a femto base station is not included in the available interval, operating the low-duty mode comprises:
      changing the low-duty mode cycle pattern by adding the available interval including the paging listening interval to the low-duty mode cycle pattern; and
      operating the low-duty mode according to the changed low-duty mode cycle pattern.

10. The method of claim 9, further comprising:
    if a paging listening interval of a paging cycle managed by any one femto base station is not included in the available interval, shifting the paging listening interval so as to be included in the available interval.

11. The method of claim 10, further comprising transmitting, to a terminal, a message notifying that the paging listening interval has been shifted.

12. The method of claim 9, wherein the femto base stations comprise base stations using a same frequency.

13. The method of claim 9, wherein the femto base stations comprise base stations using a same paging group ID.

14. The method of claim 13, wherein the available interval is set to include a paging listening interval of a paging cycle used by a paging group.

15. A method of operating a low-duty mode in a femto base station, the method comprising:
    managing a paging cycle including a paging listening interval and a paging unavailable interval;
    setting a low-duty mode cycle pattern including an available interval and an unavailable interval;
    scheduling an available interval of the femto base station based on the paging listening interval of the paging cycle and the available interval of the low-duty mode cycle pattern; and
    if the paging listening interval of the paging cycle managed by the femto base station is not included in the available interval;
       changing the low-duty mode cycle pattern by adding the available interval including the paging listening interval to the low-duty mode cycle pattern, and
       operating the low-duty mode according to the changed low-duty mode cycle pattern.

16. The method of claim 15, wherein the available interval of the femto base station comprises the paging listening interval of the paging cycle and the available interval of the low-duty mode cycle pattern.

17. The method of claim 15, wherein the setting comprises:
    setting the available interval of the low-duty mode cycle pattern to include the paging listening interval.

18. The method of claim 16, wherein the setting comprises:
    setting the unavailable interval to be shorter than the paging unavailable interval.

19. The method of claim 15, wherein:
    the managing comprises managing a plurality of paging cycles, and
    the setting comprises setting a plurality of low-duty mode cycle patterns respectively corresponding to the plurality of paging cycles.

* * * * *